United States Patent
Ueda et al.

[11] Patent Number: 6,137,854
[45] Date of Patent: Oct. 24, 2000

[54] REACTOR CONTROL ROD AND METHOD OF MANUFACTURING THE SAME

[75] Inventors: Makoto Ueda; Shinichi Ishizato; Satoko Tajima, all of Yokohama; Nagayoshi Ichikawa, Kawasaki; Masato Takahashi, Yokohama, all of Japan

[73] Assignee: Kabushiki Kaisha Toshiba, Kawasaki, Japan

[21] Appl. No.: 09/174,259

[22] Filed: Oct. 16, 1998

[30] Foreign Application Priority Data

Oct. 16, 1997 [JP] Japan .................................. 9-283907

[51] Int. Cl.[7] .............................. G21C 7/00; G21C 7/06
[52] U.S. Cl. ........................................... 376/333; 376/327
[58] Field of Search ..................................... 376/327, 333

[56] References Cited

U.S. PATENT DOCUMENTS

| | | | |
|---|---|---|---|
| 3,115,452 | 12/1963 | Rock | 376/327 |
| 3,234,104 | 2/1966 | Gale et al. | 376/327 |
| 3,309,118 | 3/1967 | Anthony | 376/327 |
| 4,676,948 | 6/1987 | Cearley et al. | 376/333 |
| 4,861,544 | 8/1989 | Gordon | 376/333 |
| 4,876,060 | 10/1989 | Yoshioka et al. | 376/333 |
| 4,882,123 | 11/1989 | Cearley et al. | 376/333 |

FOREIGN PATENT DOCUMENTS

| | | | |
|---|---|---|---|
| 2002984 | 1/1980 | Japan | 376/327 |
| 57-080592 | 5/1982 | Japan | 376/327 |
| 62-235595 | 10/1987 | Japan | 376/327 |
| 62-254097 | 11/1987 | Japan | 376/327 |
| 62-254098 | 11/1987 | Japan | 376/327 |
| 63-289486 | 11/1988 | Japan | 376/327 |
| 9034358 | 7/1989 | Japan | 376/327 |
| 2002985 | 1/1990 | Japan | 376/327 |
| 2304394 | 12/1990 | Japan | 376/327 |
| 03220496 | 9/1991 | Japan | 376/327 |
| 4106496 | 4/1992 | Japan | 376/327 |
| 4127086 | 4/1992 | Japan | 376/327 |

OTHER PUBLICATIONS

Ueda et al.; "Thermal Reactor Design, Validation and Operating Experience—II"; Reactor Material Handbook; vol. 55; (1987); pp. 616–617.

*Primary Examiner*—Charles T. Jordan
*Assistant Examiner*—Jack Keith
*Attorney, Agent, or Firm*—Foley & Lardner

[57] ABSTRACT

There is provided a reactor control rod which is capable of suppressing an excessive frictional force acting on passive state oxide films formed on the surfaces of neutron absorber elements, and also reducing the possibility to cause electrochemical problems, and a method of manufacturing the same. The reactor control rod comprises a wing having a sheath which has a substantially U-shaped cross-section. A top end structure is secured to a longitudinal top end of the sheath. A bottom end structure is secured to a longitudinal bottom end of the sheath. An opening portion of the sheath is secured to a central structure. A neutron absorber element is made of neutron absorbing material. The neutron absorber element is charged in the sheath. A supporting rod through hole is formed in the neutron absorber element, so as to penetrate the neutron absorber element. A supporting rod fitting hole is formed in the sheath. A load supporting rod is inserted into the supporting rod through hole. The load supporting rod has a top end portion and a main body portion. The top end portion is inserted into the supporting rod fitting hole, so as to support the weight of the neutron absorber element by the sheath via the load supporting rod. The main body portion has a diameter lager than that of the top end portion. A step is formed by a difference in diameters between the top end portion and the main body portion, so as to create a minute clearance between the sheath and the neutron absorber element.

3 Claims, 11 Drawing Sheets

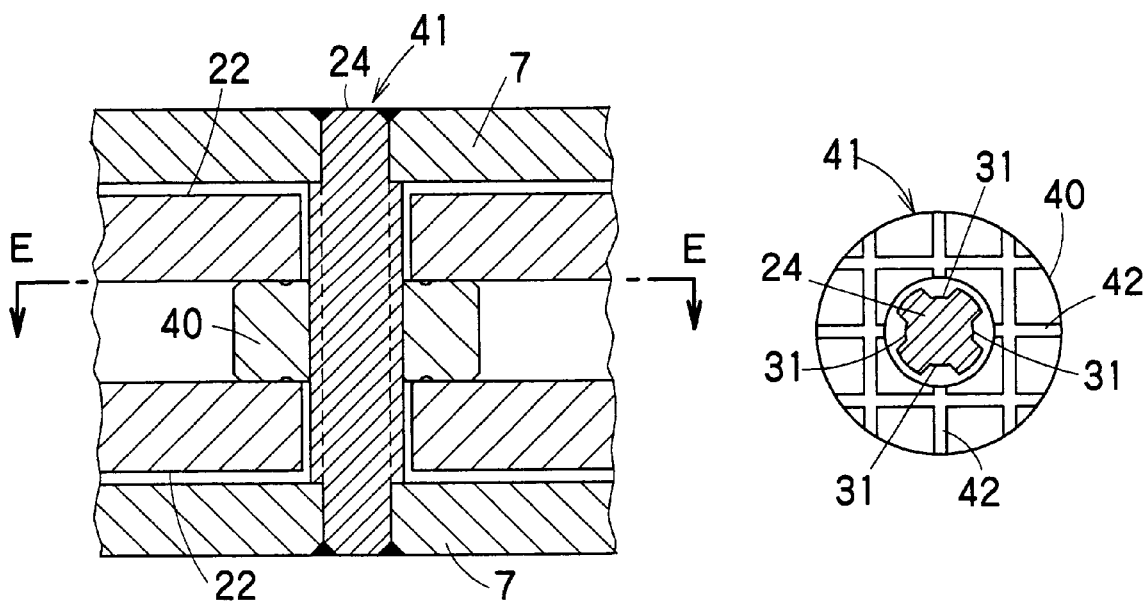
FIG. 3A
FIG. 3E
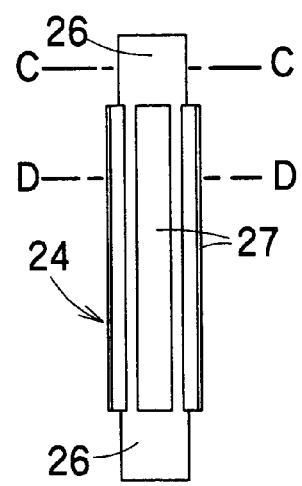
FIG. 3B
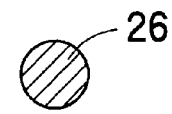
FIG. 3C
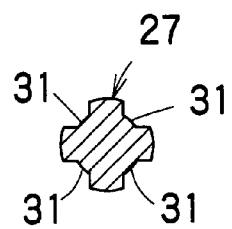
FIG. 3D

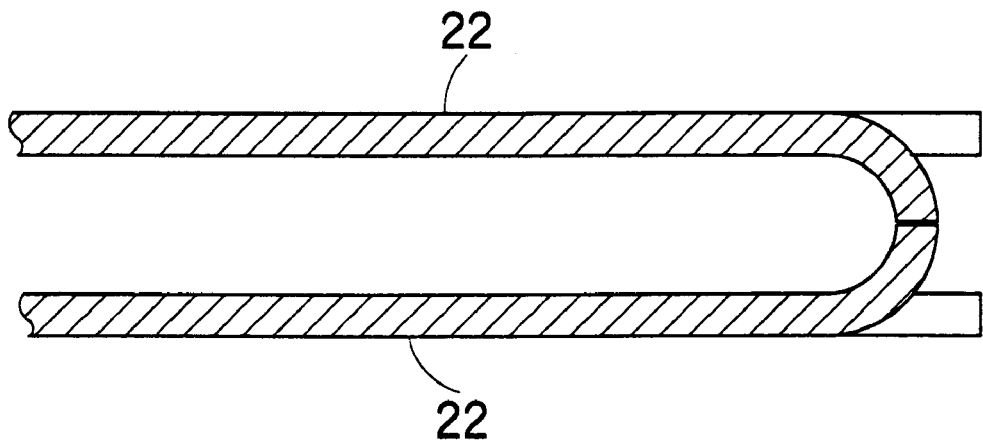
F I G. 6 A
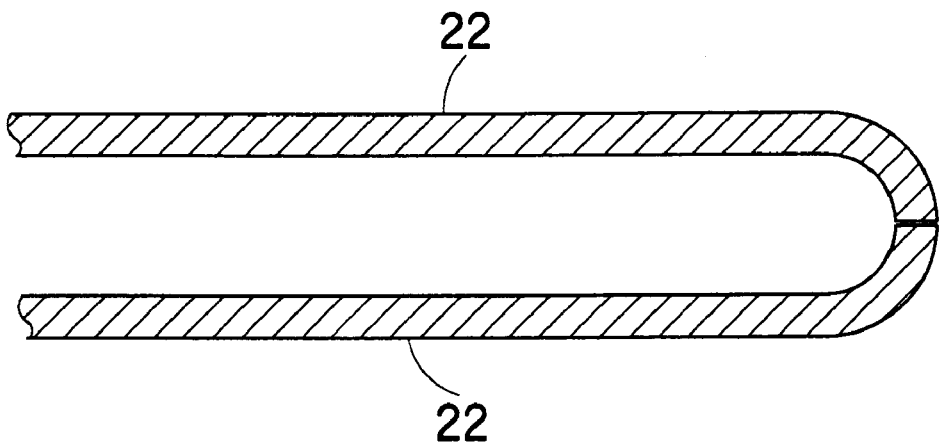
F I G. 6 B

REACTOR CONTROL ROD AND METHOD OF MANUFACTURING THE SAME

BACKGROUND OF THE INVENTION

1. Field of the Invention

The present invention relates to a reactor control rod and a method of manufacturing the same, and, more particularly, a long-life type reactor control rod suitable for a boiling water reactor and a method of manufacturing the same.

2. Description of the Related Art

Generally, a control rod of a boiling water reactor (abbreviated as a "BWR" hereinafter) is constructed by inserting neutron absorber elements made of a neutron absorbing material into a plurality of long sheaths. Each sheath has a deep U-shaped cross sectional shape. In this way, a plurality (four sheets) of wings are formed. A top end structure and a bottom end structure are secured to insertion top ends and insertion bottom ends respectively. U-shaped opening portions of the sheath are secured to the tie rod, so that the control rod is constructed to have a cruciform sectional shape.

In the BWR control rod in the related art, the sheath has been made of stainless steel. $B_4C$ powder is filled into the stainless steel pipe having a diameter of about 5 mm. The stainless steel pipe with $B_4C$ has been employed as a neutron absorber rod.

However, since boron (B) can react with the neutron to produce helium (He) and lithium (Li) and also has a short nuclear lifetime, the neutron absorbing capability of the neutron absorber rod is ready to deteriorate. In addition, since soundness of the neutron absorber rod is ready to deteriorate by increase of the partial pressure of He, etc., the mechanical lifetime of the neutron absorber rod is short.

Therefore, for the control rod which needs the long lifetime, a control rod, in which a part or all of the conventional neutron absorber rods are replaced with hafnium (Hf), has been developed and has been employed in practical use. The hafnium (Hf) can be used as a long-life type neutron absorbing material.

A specific gravity of Hf is very large such as about 13. Thus, if a Hf rod, which has the same cross sectional shape as the conventional neutron absorber rod using $B_4C$, is employed, the neutron absorbing capability (reactivity value) of the Hf rod is substantially identical to that of the conventional neutron absorber rod, nevertheless the weight of the entire control rod is increased up to about 1.5 times. For this reason, such Hf control rod fails to back-fit to the reactor in operation.

The inventors of the present invention have proposed the Hf control rod which has the so-called "trap type" configuration in which Hf is formed like a plate and then the core water is introduced into the clearance between two opposing Hf plates (refer to Japanese Patent Application Publication (KOKAI) Sho 57-80592, etc.). Further, taking into account a feature of the BWR that the neutron absorbing capability may be lowered at about half area on the insertion bottom end side, the inventors of the present invention have proposed the control rod having the structure in which an amount of Hf on the insertion bottom end side can be set less than that on the insertion top end side (refer to Japanese Patent Application Publication (KOKAI) Sho 62-235595, etc.).

The trap type long-life control rod using the Hf plates has already been employed in a great number of BWRs, and has achieved satisfactory actual results. In order to accumulate sufficient actual results as the control rod, the lifetime of the Hf control rod is set conservatively, i.e., shorter at the existing time, but such a prospect can be obtained up to now that the set lifetime can be prolonged still much more.

FIGS. 10A to 10C and FIGS. 11A and 11B are views showing outlines of design examples of a so-called Hf trap type control rod in the related art respectively. FIG. 10A is a perspective view, partially cut away, showing the Hf trap type control rod, FIG. 10B is a cross sectional view showing one wing of the Hf trap type control rod, and FIG. 10C is a perspective view showing a load supporting member ("load supporting spacer" or "top spacer") shown in FIG. 10B. FIG. 11A is a front view showing the Hf trap type control rod from which a front sheath is removed from FIG. 10A, and FIG. 11B is a view showing an example of distribution of thickness of the Hf plate, which is a neutron absorbing material fitted into the sheath, along the control rod axis direction (inserting/withdrawing direction, or sheath longitudinal direction).

The control rod 1 has a cruciform cross sectional shape. The top end structure 4 which is formed integrally with a handle 3 is secured to the insertion top end portion and the bottom end structure 5 is secured to the insertion bottom end portion. The cruciform tie rod 6 made of stainless steel is positioned at the axial center portion of the control rod 1. The opening portions of the stainless steel sheaths 7, each having a deep U-shaped cross sectional shape, are secured to respective projected portions of the tie rod 6 by welding, so that four sheets of wings 2 are constructed.

A plurality of water feed holes 9 are formed in the sheath 7 to enable flow of the core water.

Two sheets of Hf plates 10 are arranged oppositely and spaced from each other by load supporting spacers (top spacers) 12 in the sheath 7, so as to create a water gap 11 (clearance which is filled with the water when used in the reactor) therebetween. The top spacer 12 has a top-like structure. The top spacer 12 comprises an interval holding portion (spacer portion) 12a whose thickness of the body portion has a spacer function, and axes 12b. The axes 12b of the top spacers 12 are inserted into holes of the sheath 7, and then welded to the sheath 7 to support the weights of the Hf plates 10.

The stainless steel sheath 7 and the Hf plate are different three times in thermal expansion coefficient. Therefore, a diameter of the hole in the Hf plate 10, into which the axis 12b of the load supporting spacer 12 is inserted, is set larger than that of the axis 12b of the load supporting spacer 12 to thus avoid the problem of thermal expansion/contraction in the thermal cycle.

In the example in FIG. 11A, the Hf plate 10 is divided into a plurality of pieces, e.g., eight pieces along the axis direction (sheath longitudinal direction) of the control rod 1. Respective pairs of Hf plates can be held by four top spacers 12. As shown in FIG. 11B, the pairs of Hf plates are formed thicker toward the insertion top end and formed thinner toward the insertion bottom end. This is because the neutron irradiation amount must be increased at the insertion top end and thus the reactivity value (reactivity effect) must be set higher. Normally, lengths of the Hf plates 10 in the axis direction (sheath longitudinal direction) are set identically along the axis direction, and thicknesses of the sheath plates are kept constant along the axis direction.

It has been disclosed in "Reactor Material Handbook" (published by The Nikkan Kogyo Shimbun Ltd.), etc. that the thermal expansion coefficient ($17.8 \times 10^{-6}$/deg-C) of stainless steel is about three times larger than that ($5.9 \times 10^{-6}$/deg-C) of Hf.

In the meanwhile, both the stainless steel and the Hf are very excellent in the high temperature corrosion resistance. However, if the longer set lifetime is needed, it is preferable that the well known electrochemical corrosion problem caused by adjacent metals of a different kind, i.e., the stainless steel sheath and the Hf plate should be thought over and thus the countermeasure should be applied positively.

More particularly, in the case of Hf, an oxide film is formed on the surface of the Hf plate in the high temperature core water, and therefore a so-called "passive state oxide film" to protect the inside of Hf is formed. However, such oxide film is deteriorated in mechanical strength comparing with the Hf metal or the Hf alloy. Hence, it is desired that the structural design not to apply a high friction force to the oxide film should be adopted and also the electrochemical problem should be relaxed by improving the water feed characteristic.

SUMMARY OF THE INVENTION

Therefore, it is an object of the present invention to provide a reactor control rod whose structure is capable of suppressing an excessive friction force acting on a passive state oxide film, which is formed on a surface of a neutron absorber element, and also reducing the possibility to cause electrochemical problems, in order to ensure future soundness of a long-life control rod, which continues to bring about satisfactory actual results, against estimated electrochemical problems, and a method of manufacturing the same.

It is another object of the present invention to provide a reactor control rod whose structure is capable of suppressing the progress of corrosion caused by an electrochemical action and also deferring the progress of corrosion of Hf even if such corrosion is caused.

To achieve the above-mentioned objects, the present invention provides a reactor control rod, comprising: a wing having a sheath which has a substantially U-shaped cross-section; a top end structure secured to a longitudinal top end of said sheath; a bottom end structure secured to a longitudinal bottom end of said sheath; a central structure to which an opening portion of said sheath is secured; a neutron absorber element made of neutron absorbing material, said neutron absorber element charged in said sheath; a supporting rod through hole formed in said neutron absorber element, so as to penetrate said neutron absorber element; a supporting rod fitting hole formed in said sheath; and a load supporting rod inserted into said supporting rod through hole, said load supporting rod having: a top end portion inserted into said supporting rod fitting hole, so as to support a weight of said neutron absorber element by said sheath via said load supporting rod, a main body portion having a diameter lager than that of said top end portion, and a step formed by a difference in diameters between said top end portion and said main body portion, so as to create a minute clearance between said sheath and said neutron absorber element.

Further, it is preferable that a groove is formed on a surface of said main body portion of said load supporting rod in substantially parallel with a longitudinal direction of said load supporting rod.

Further, it is referable that said neutron absorber element comprises a pair of neutron absorber plates, said neutron absorber plates being opposed to and spaced from each other by a local spacer, so as to hold a predetermined clearance between said opposing neutron absorber plates.

Further, it is preferable that said local spacer comprises a body portion provided between said opposing neutron absorber plates, so as to hold said predetermined clearance therebetween, and axis portions protruded from both ends of said body portion, so as to be inserted into spacer through holes formed in said neutron absorber plates, wherein top ends of said axis portions are slightly protruded outwardly beyond outer surfaces of said neutron absorber plates, so as to create minute clearances between said sheath and said neutron absorber plates.

Further, it is preferable that said local spacer has a convex portions which is arranged between said opposing neutron absorber plates at end portions in a sheath widthwise direction, so as to hold said predetermined clearance between said opposing neutron absorber plates.

Further, it is preferable that said neutron absorber element comprises a pair of absorber plates being opposed to and spaced from each other, said absorber plates curved at end portions in a sheath widthwise direction locally or over full length, the curved portions are secured with each other to be integrated.

Further, it is preferable that said supporting rod through hole is provided in substantially middle area of said neutron absorber element in a sheath longitudinal direction, such that a clearance in the sheath longitudinal direction between a hole wall surface of said supporting rod through hole and a peripheral surface of said main body portion of said load supporting is narrower than that in the sheath widthwise direction.

Further, it is preferable that said supporting rod through holes are formed on both a top end side and a bottom end side of said neutron absorber element in a sheath longitudinal direction, an inner diameter of one said supporting rod through hole is set so large that a movement of said neutron absorber plates due to thermal expansion is allowed, and an inner diameter of another said supporting rod through hole is set such that a clearance in a sheath longitudinal direction between a hole wall surface of said supporting rod through hole and a peripheral surface of said main body portion of said load supporting rod is narrower than that in the sheath widthwise direction.

Further, it is preferable that said neutron absorber element comprises a pair of neutron absorber plates being opposed to and spaced from each other, and wherein a spacer/load supporting rod is made by inserting said load supporting rod into an annular spacer, said opposing neutron absorber plates being spaced from each other by said annular spacer, whereby a weight of said neutron absorber element is supported by said sheath via said load supporting rod.

Further, it is preferable that said neutron absorber element is made of neutron absorbing material containing at least hafnium, and hafnium densities in surface portions of said neutron absorber element are set lower than that in an inner portion of said neutron absorber element.

Further, it is preferable that a smoothness of a surface of said neutron absorber element is improved, so that an effective surface area of said neutron absorber element is reduced.

Further, it is preferable that a water feed hole is formed in said sheath, and an edge portion of said water feed hole on a side near said neutron absorber element is chamfered.

The present invention provides a reactor control rod, comprising: a wing having a sheath which has a substantially U-shaped cross-section; a top end structure secured to a longitudinal top end of said sheath; a bottom end structure secured to a longitudinal bottom end of said sheath; a central structure to which an opening portion of said sheath is secured; a neutron absorber element charged in said sheath;

said neutron absorber element being made of neutron absorbing material containing at least hafnium, and hafnium densities in surface portions of said neutron absorber element are set lower than that in an inner portion of said neutron absorber element.

The present invention provides a reactor control rod, comprising: a wing having a sheath which has a substantially U-shaped cross-section; a top end structure secured to a longitudinal top end of said sheath; a bottom end structure secured to a longitudinal bottom end of said sheath; a central structure to which an opening portion of said sheath is secured; a neutron absorber element made of neutron absorbing material which is charged in said sheath; wherein a smoothness of a surface of said neutron absorber element is improved, so that an effective surface area of said neutron absorber element is reduced.

The present invention provides a reactor control rod, comprising: a wing having a sheath which has a substantially U-shaped cross-section; wherein a water feed hole is formed in said sheath, and an edge portion of said water feed hole on a side near said neutron absorber element is chamfered; a top end structure secured to a longitudinal top end of said sheath; a bottom end structure secured to a longitudinal bottom end of said sheath; a central structure to which an opening portion of said sheath is secured; a neutron absorber element made of neutron absorbing material which is charged in said sheath.

The present invention provides a method of manufacturing a reactor control rod, said reactor control rod comprising a wing having a sheath which has a substantially U-shaped cross-section, a top end structure secured to a longitudinal top end of said sheath, a bottom end structure secured to a longitudinal bottom end of said sheath, a central structure to which an opening portion of said sheath is secured, and a neutron absorber element made of neutron absorbing material which is charged in said sheath, comprising the steps of: forming a supporting rod through hole, so as to penetrate through said neutron absorbing element; engaging a load supporting rod, which are used to support a weight of said neutron absorber element by said sheath, with a supporting rod fitting hole formed in said sheath by inserting said load supporting rod into said supporting rod through hole; securing said load supporting rod to said sheath while holding a minute clearance by using a manufacturing spacer which is interposed adjacent to said load supporting rod between said sheath and said neutron absorber element; and removing said manufacturing spacer after securing said load supporting rod to said sheath.

BRIEF DESCRIPTION OF THE DRAWINGS

FIGS. 2A and 2B are views showing a pertinent portion of the wing of the reactor control rod according to the first embodiment of the present invention in an enlarged manner respectively, wherein FIG. 2A is a sectional view showing the pertinent portion of the wing of the reactor control rod taken along a line A—A in FIG. 2B, and FIG. 2B is a cross sectional view showing the pertinent portion of the wing of the reactor control rod taken along a line B—B in FIG. 2A;

FIG. 3A is a cross sectional view showing a pertinent portion of a reactor control rod according to a second embodiment of the present invention;

FIG. 3B is a view showing only a load supporting rod shown in FIG. 3A;

FIG. 3C is a sectional view showing the load supporting rod taken along a line C—C in FIG. 3B;

FIG. 3D is a sectional view showing the load supporting rod taken along a line D—D in FIG. 3B;

FIG. 3E is a sectional view showing the pertinent portion of the reactor control rod taken along a line E—E in FIG. 3A;

FIGS. 5A and 5B are views showing a pertinent portion of a wing of a reactor control rod according to a fourth embodiment of the present invention in an enlarged manner, wherein FIG. 5A is a sectional view showing the pertinent portion of the wing of the reactor control rod taken along a line A—A in FIG. 5B, and FIG. 5B is a cross sectional view showing the pertinent portion of the wing of the reactor control rod taken along a line B—B in FIG. 5A;

FIG. 6A is a sectional view showing end portions of neutron absorber plates of one modification of the fourth embodiment;

FIG. 6B is a sectional view showing end portions of neutron absorbent plates of another modification of the fourth embodiment;

FIGS. 10A to 10C are views showing an outline of a design example of a so-called trap type Hf control rod in the related art respectively, wherein FIG. 10A is a perspective view, partially cut away, showing the trap type Hf control rod, FIG. 10B is a cross sectional view showing one wing of the trap type Hf control rod, and FIG. 10C is a perspective view showing a load supporting member shown in FIG. 10B; and FIGS. 11A and 11B are views showing an outline of another design example of the so-called trap type Hf control rod in the related art respectively, wherein FIG. 11A is a front view showing the trap type Hf control rod from which a front sheath is removed from FIG. 10A, and FIG. 11B is a view showing an example of distribution of thickness of the Hf plate, which is a neutron absorbing material fitted in the sheath, along the control rod axis direction (inserting/withdrawing direction or sheath longitudinal direction).

DESCRIPTION OF THE PREFERRED EMBODIMENTS

Various embodiments of the present invention will be explained in detail with reference to the accompanying drawings hereinafter.

First Embodiment

A reactor control rod according to a first embodiment of the present invention will be explained with reference to FIGS. 1A and 1B and FIGS. 2A and 2B hereinbelow.

Figure 1A:
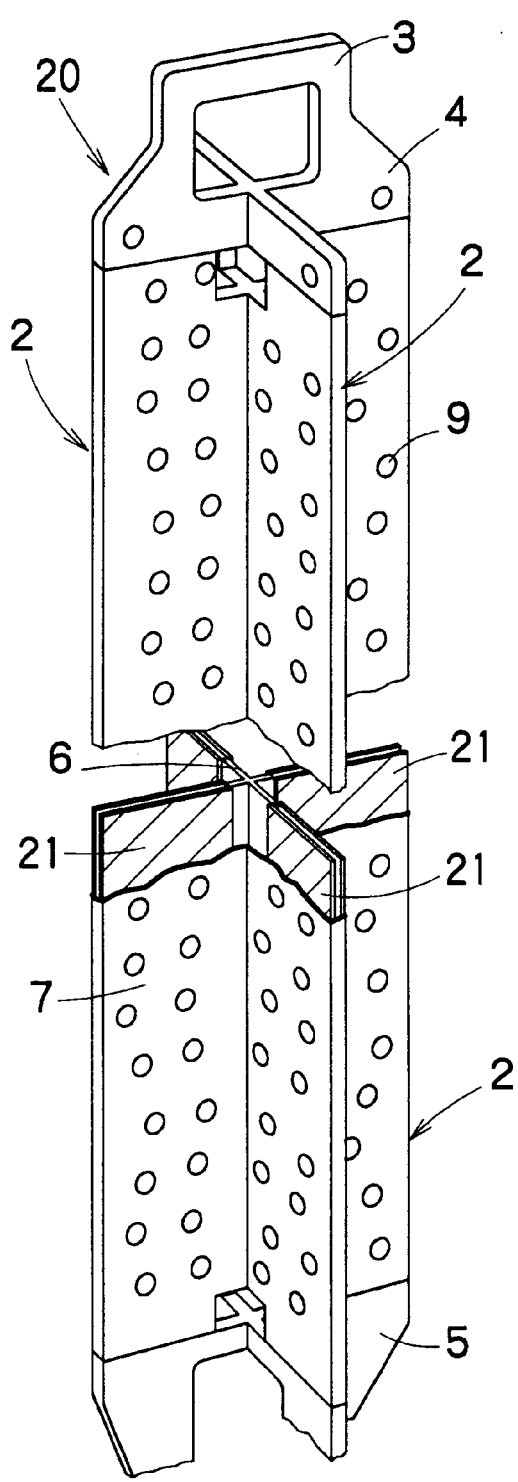
FIG. 1A is a perspective view, partially cut away, showing a reactor control rod according to a first embodiment of the present invention.
Figure 1B:
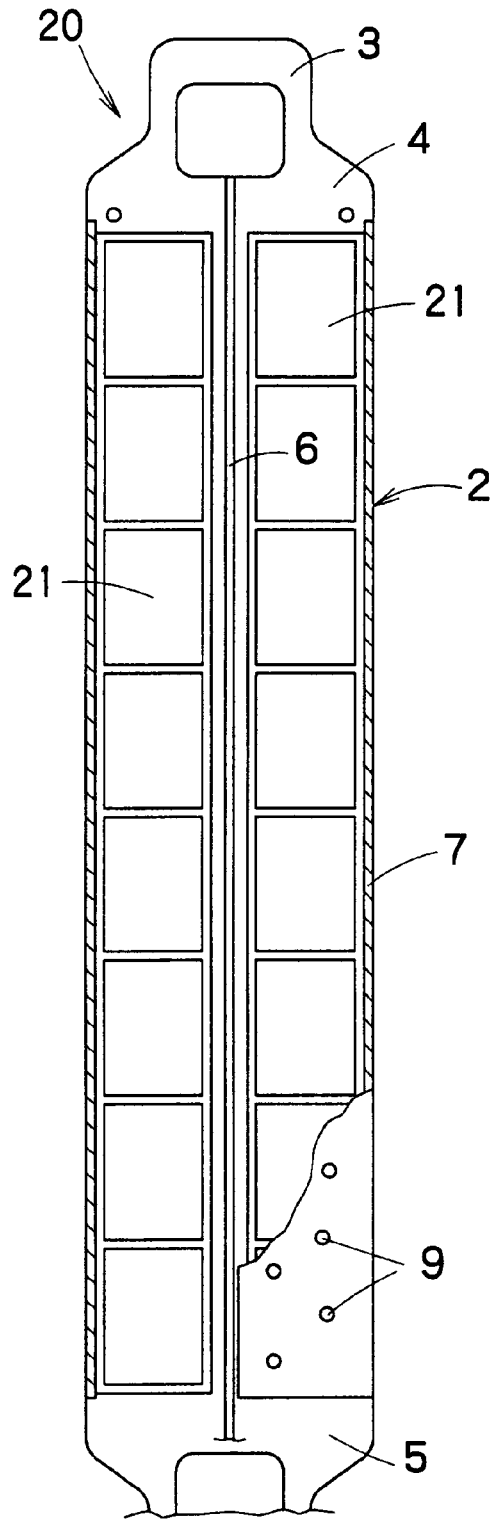
FIG. 1B is a front view showing the reactor control rod according to the first embodiment of the present invention, while partially cutting away wings thereof.

FIG. 1A is a perspective view, partially cut away, showing the reactor control rod according to the first embodiment. FIG. 1B is a front view showing the reactor control rod according to the first embodiment, with partially cutting away wings of the reactor control rod.

As shown in FIGS. 1A and 1B, in the reactor control rod 20 according to the first embodiment, a top end structure 4 which is formed integrally with a handle 3 is secured to a longitudinal top end of a long sheath 7 which has a deep U-shaped cross sectional shape, and a bottom end structure 5 is secured to a longitudinal bottom end of the long sheath 7. The sheath 7 is formed of stainless steel.

A plurality of water feed holes 9 are formed in the sheath 7. A plurality of neutron absorber elements 21, each being made of longlife neutron absorbing material, e.g., hafnium (Hf), Hf alloy, or the like are aligned like a column in the sheath 7 along the sheath longitudinal direction. As a consequence, a plurality (four sheets) of wings 2 are formed.

An opening portion of the sheath 7 constituting the wing 2 is fitted to each projected portion of a tie rod (central structure) 6 and then secured thereto by welding. The tie rod 6 acts as a central assembling material and is made of cruciform stainless steel. As a result, the reactor control rod 20 which has a cruciform cross sectional shape can be assembled by using a plurality of wings 2 in combination.

Figure 2A:
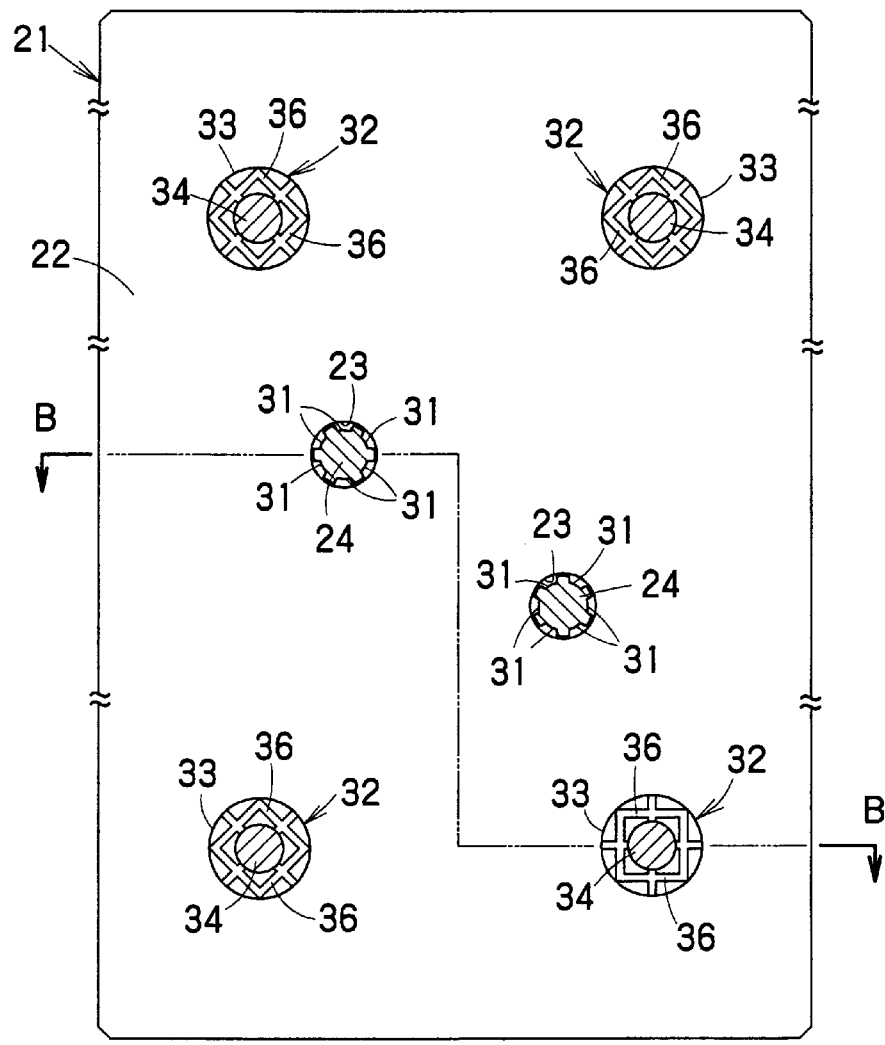
Figure 2B:
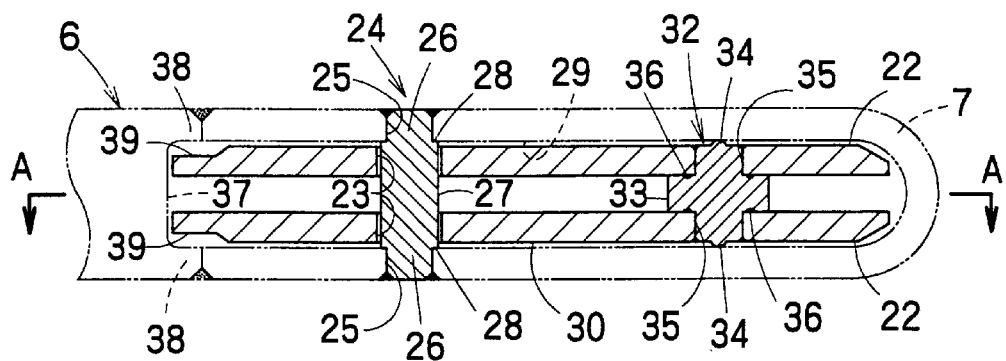

FIGS. 2A and 2B are views showing a pertinent portion of the wing 2 of the reactor control rod according to the first embodiment in an enlarged manner respectively. FIG. 2A is a sectional view showing the pertinent portion of the wing of the reactor control rod taken along a line A—A in FIG. 2B. FIG. 2B is a cross sectional view showing the pertinent portion of the wing of the reactor control rod taken along a line B—B in FIG. 2A.

As shown in FIGS. 2A and 2B, the neutron absorber element 21 is constructed by opposing a pair of neutron absorber plates (Hf plates) 22 made of hafnium (Hf) or hafnium alloy to each other.

In the middle portion of the neutron absorber plates 22 along the sheath longitudinal direction, a pair of supporting rod through holes 23 are formed at different height levels so as to penetrate the neutron absorber plates 22 in their thicknesswise direction. Then, load supporting rods 24 which support the weight of the neutron absorber plates 22 via the sheath 7 are inserted into the supporting rod through holes 23.

As shown in FIG. 2B, the load supporting rod 24 comprises a pair of top end portions 26 which are inserted into supporting rod fitting holes 25 formed in the sheath 7 and then secured thereto by welding, and a main body portion 27 which is inserted into the supporting rod through hole 23 and has a diameter larger than those of the top end portions 26.

In addition, because of difference in diameter between the top end portions 26 and the main body portion 27, steps 28 are formed on the load supporting rod 24. A minute clearance can be created by the step 28 between an inner surface 29 of the sheath 7 and an outer surface 30 of the neutron absorber plate 22. Because of the presence of small steps 28, the sheath 7 and the neutron absorber plates 22 can avoid the situation that they are subjected to strong pressure mutually.

The load supporting rods 24 and the sheath 7 are formed of weldable metal, and normally they are formed of stainless steel. Both the Hf plate and the stainless steel constituting the neutron absorber plate 22 are extremely excellent in corrosion resistance. However, since the Hf plate and the stainless steel are metals of a different kind, it cannot be assured that there is no possibility of a battery action being caused electrochemically.

Therefore, in order not to generate a long-term stagnation of the core water being interposed between the neutron absorber plates 22, a plurality of longitudinal grooves 31 are formed on a surface of the main body portion 27 of the load supporting rod 24 in almost parallel with the longitudinal direction (axis direction) of the load supporting rod 24. A diameter of the top end portion 26 which is inserted into the supporting rod fitting hole 25 of the sheath 7 is reduced by scraping off to such an extent that the longitudinal grooves 31 are eliminated or more, so that the step 28 is formed on the top end portion 26 as described above.

Because of the presence of the step 28, the sheath 7 and the top end portion 26 of the load supporting rod 24 can be correctly positioned when they are to be welded, and also heat leakage into the neutron absorber plate (Hf plate) 22 in welding can be suppressed.

Since the longitudinal grooves 31 are formed on the main body portion 27 of the load supporting rod 24, the core water can be passed between the load supporting rod 24 and the neutron absorber plate 22 to thus prevent the stagnation of the core water. As a result, clevis corrosion can be suppressed.

In this case, a clearance holding mechanism for holding the clearance between the sheath 7 and the neutron absorber plate (Hf plate) 22 is not depicted in vicinity of the load supporting rod 24 in FIGS. 2A and 2B. However, various mechanisms, e.g., formation of dimpling on the sheath 7 toward the inside from the outside, placement of an interposition such as a washer (including formation of projections on the Hf plate), provision of pins, etc. which protrude slightly from the inner surface of the sheath 7 toward the inside from the outside, employment of a top axis structure, or the like may be employed.

Great difference in thermal expansion coefficient resides between the Hf and the stainless steel. Hence, if mutual distances between a plurality of load supporting rods 24 are set long, a diameter of the supporting rod through hole 23 formed in the neutron absorber plate (Hf plate) 22 must be enlarged in order to avoid the problem of difference in thermal expansion coefficient. In this case, since the impact load applied to the load supporting rod 24 upon driving the reactor control rod 20 is increased, it is desired that mutual intervals between the load supporting rods 24 should not be set long. For example, preferably such intervals should be set to about 3 to 5 cm.

As shown in FIGS. 2A and 2B, a predetermined clearance (water gap) is held between a pair of opposing neutron absorber plates 22 by using a plurality of local spacers (Hf spacers) 32.

Each of the local spacers 32 comprises a body portion 33 provided between a pair of neutron absorber plates 22 to hold a predetermined clearance between the neutron absorber plates 22, and axis portions 34 which are protruded from both ends of the body portion 33 to be inserted into spacer through holes 35 formed in the neutron absorber plates 22. Thus, the core water can be flown through via the clearance between the neutron absorber plates 22.

Like the neutron absorber plates 22, the local spacer 32 is also formed of hafnium or hafnium alloy. The axis portions 34 of the local spacer 32 are welded to the neutron absorber plates (Hf plates) 22 respectively. Unlike the case of the load supporting rod 24, the local spacers 32 are not secured to the sheath 7.

Top ends of the axis portions 34 of the local spacer 32 are projected outward slightly (e.g., 0.2 to 0.5 mm) from the outer surface 30 of the neutron absorber plates 22 respectively. Therefore, minute clearances can be created by such projected portions between the inner surface 29 of the sheath 7 and the outer surfaces 30 of the neutron absorber plates 22 so as to enable flow of the core water.

Since the minute clearances are created by the projected portions of the axis portions 34 of the local spacers 32 as described above, full contact between the inner surface 29 of the sheath 7 and the outer surfaces 30 of the neutron absorber plates 22 can be prevented and also excessive generation of the oxide film on the outer surfaces 30 of the neutron absorber plates 22 can be suppressed.

It is preferable that top ends of the axis portions 34 of the local spacer 32 should be shaped so as to reduce contact areas between the inner surface 29 of the sheath 7 and the top ends. For instance, it is preferable that the axis portions 34 should be formed to have a tapering shape respectively, or local convex portions should be provided on end surfaces of the axis portions 34 respectively.

In order to prevent the long-term stagnation of the core water, grooves 36 are formed on surfaces of the local spacer (Hf spacer) 32. However, in the event that the corrosion problem due to the stagnation of the core water does not particularly become an issue, such grooves 36 are not always provided.

The local spacer 32 is shown in FIGS. 2A and 2B by way of example. The shape of the local spacer 32 is not limited to the illustrated shape. In other words, if a portion of the local spacer, which is placed in the clearance formed between a pair of the neutron absorber plates (Hf plates) 22, can have a diameter slightly larger than that of the spacer through hole 35, the local spacer can be positioned upon welding. Therefore, any local spacer to satisfy the above may be employed.

A left end shown in FIG. 2B is a side end portion of the cruciform tie rod 6. A convex cut 37 is formed on both side surfaces so as to leave a pair of outer thickness 38 which correspond to the thickness of the sheath 7. The top end portion of the sheath 7 is welded to top ends of a pair of convex portions 38 on both side surfaces of the cruciform tie rod 6 by using butt welding. In addition, in the side end portions of the neutron absorber plates 22 which are located on the tie rod 6 side, respective surfaces 39 facing to the sheath 7 side are formed thin.

According to these structures, excessive heat application at welding of the sheath 7 can be prevented to thus improve the soundness of welding, the reactivity effect can be improved since a wing width of the neutron absorber plate (Hf plate) 22 is expanded, and the electrochemical corrosion problem such as clearance corrosion can be considerably relaxed by creating the clearance at the corner portions.

As described above, according to the reactor control rod of the first embodiment, contact portions of the sheath 7 made of stainless steel to the members made of hafnium or hafnium alloy can be limited to the top end portions of the axis portions 34 of the local spacers 32. As a result, contact areas between metals of a different kind can be remarkably reduced and also the possibility of the electrochemical corrosion can be reduced.

Furthermore, the minute clearance is created between the inner surface 29 of the sheath 7 and the outer surface 30 of the neutron absorber plate 22. As a result, the flow of the core water can be accelerated via the clearance, and exfoliation of the passive state oxide film which is formed on the surface of the neutron absorber plate 22 hardly occurs, so that the inside of the neutron absorber plate 22 can be protected over a long term.

Since the corrosion problem can be relaxed extremely in this manner, the long-term reactor control rod, in which the nuclear lifetime and the electrochemical lifetime can be well balanced, can be derived. As a result, economical efficiency and safety of the nuclear power generation can be improved and also an amount of radioactive waste can be reduced.

Second Embodiment

Next, a reactor control rod according to a second embodiment of the present invention will be explained with reference to FIGS. 3A to 3E hereinbelow. A feature of the reactor control rod according to the second embodiment reside in that the load supporting rod used in the above first embodiment are formed as spacer/load supporting rods which can also be used as spacers. In the second embodiment, description of configurations common to those in the first embodiment will be omitted, but configurations of different constituent portions will be explained in detail in the following.

FIG. 3A is a cross sectional view showing a pertinent portion of the reactor control rod according to the second embodiment. FIG. 3B is a view showing only a load supporting rod shown in FIG. 3A. FIG. 3C is a sectional view showing the load supporting rod taken along a line C—C in FIG. 3B. FIG. 3D is a sectional view showing the load supporting rod taken along a line D—D in FIG. 3B. FIG. 3E is a sectional view showing the pertinent portion of the reactor control rod taken along a line E—E in FIG. 3A.

A difference of the second embodiment from the first embodiment is that, as shown in FIG. 3E, a spacer/load supporting rod 41 is constructed by inserting a load supporting rod 24 into an annular grooved spacer 40. In the second embodiment, the grooved spacer 40 is made of hafnium (Hf), and thus generation of the electrochemical corrosion between the grooved spacer 40 and the neutron absorber plate (Hf plate) 22 becomes difficult. But, in order to make perfection more perfect, grooves 42 are provided on the spacer/load supporting rod 41.

Material for the grooved spacer 40 is not always limited to hafnium (Hf).

The load supporting rod 24 is formed of stainless steel like the sheath 7 and thus the electrochemical corrosion will be anticipated between the load supporting rod 24 and the grooved spacer 40. Hence, as in the load supporting rod in the above first embodiment, a plurality of longitudinal grooves 31 are provided on a surface of a main body portion 27 of the load supporting rod 24 in substantially parallel with the longitudinal direction (axial direction). Thus, a consideration not to generate the long-term stagnation of the core water is taken.

As shown in FIG. 3C, like the first embodiment, top end portions 26 of the load supporting rod 24 are scraped off so as to reduce its diameter to such extent that the longitudinal grooves 31 can be eliminated or more.

As described above, according to the reactor control rod of the second embodiment, the spacer/load supporting rod 41 can be constructed by inserting the load supporting rod 24 into the annular grooved spacer 40. As a result, an interval between two opposing neutron absorber plates (Hf plates) 22 can be properly held still in the neighborhood of the load supporting rod 24.

Because flow of the core water can be formed between constituent materials by the longitudinal grooves 31 of the load supporting rod 24 and the grooves 42 of the annular grooved spacer 40, the progress of corrosion can be suppressed.

The spacer/load supporting rods 41 may be employed in place of the local spacers (Hf spacers) 32 (see FIGS. 2A and 2B) in the above first embodiment. Otherwise, four local spacers 32 are arranged as shown in FIGS. 2A and 2B and then the spacer/load supporting rods 41 may be provided separately from these local spacers 32.

Third Embodiment

A method of manufacturing a reactor control rod according to a third embodiment of the present invention will be explained with reference to FIG. 4 hereinbelow.

Figure 4:
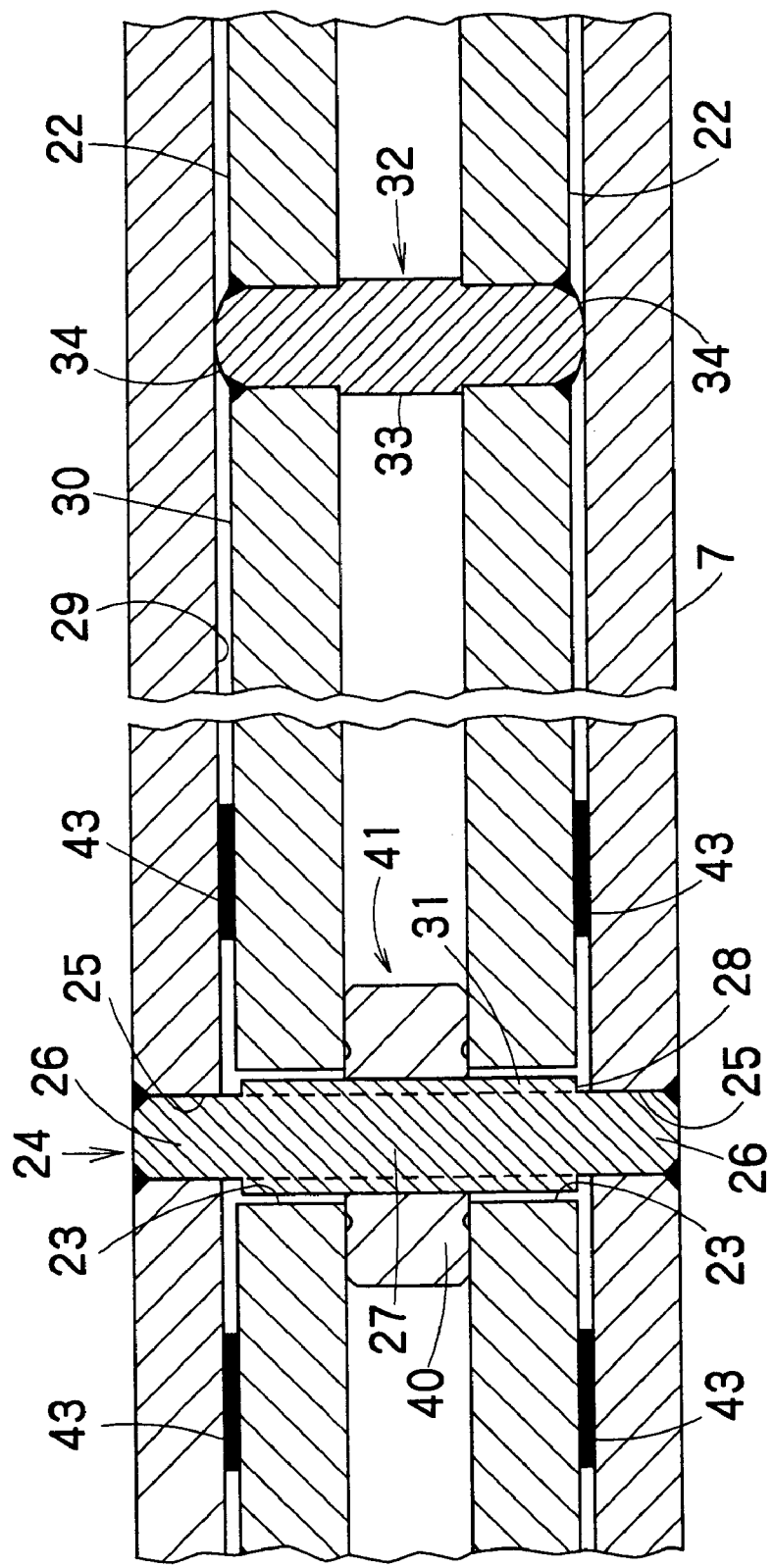
FIG. 4 is a sectional view showing a method of manufacturing a reactor control rod according to a third embodiment of the present invention.

FIG. 4 is a sectional view showing the method of manufacturing the reactor control rod according to the third embodiment.

The method of manufacturing the reactor control rod according to the third embodiment is employed to manufacture the reactor control rod having the structure shown in FIGS. 1A and 1B. More particularly, this method is employed to manufacture the reactor control rod by securing the top end structure 4 and the bottom end structure 5 respectively to the longitudinal top end and the longitudinal bottom end of the long sheath 7 which has a deep U-shaped cross sectional shape, then aligning a plurality of plate-like neutron absorber elements 21 made of a long-life neutron absorbing material in the sheath 7 along the sheath longitudinal direction like the column to thus form the wing 2, and then fitting and securing the opening portions of the wings 2 to the tie rod (central structure) 6 to assemble a plurality of wings 2 in combination.

As can be seen from FIG. 4, the reactor control rod, which is manufactured by the method of manufacturing the reactor control rod according to the third embodiment, is constructed by employing local spacers, of which body portions 33 are thiner than those of the local spacers (Hf spacers) 32 shown in FIG. 2B, and the spacer/load supporting rods 41 shown in FIG. 3A in combination.

In the method of manufacturing the reactor control rod according to the third embodiment, first the supporting rod through holes 23 are formed so as to penetrate through the neutron absorber plate 22, acting as the neutron absorber element, along its thicknesswise direction, and then the load supporting rods 24 which are used to support the weight of the neutron absorber plate 22 by the sheath 7 are inserted into the supporting rod through holes 23. The spacer/load supporting rod 41 can be constructed by inserting the load supporting rod 24 having the longitudinal grooves 31 thereon into the grooved spacer 40.

Then, the load supporting rods 24 are fitted into the supporting rod fitting holes 25 of the sheath 7. Then, while keeping minute clearances between the sheath 7 and the neutron absorber plates 22 by using a plurality of thin manufacturing spacers 43 which are interposed in the neighborhood of the load supporting rods 24, the top end portions 26 of the load supporting rods 24 are secured to the sheath 7 by welding. The manufacturing spacers 43 are interposed between the sheath 7 and the neutron absorber plates (Hf plates) 22 along the direction at a right angle relative to the longitudinal direction.

In this manner, since a predetermined interval is assured between the sheath 7 and the neutron absorber plates 22 by the manufacturing spacers 43, relative positional relationships between the inner surface 29 of the sheath 7 and the outer surface 30 of the neutron absorber plate 22 can be precisely positioned when the top end portions 26 of the load supporting rods 24 are secured to the sheath 7 by welding.

As shown in FIG. 4, the steps 28 of the load supporting rods 24 are slightly separated from the inner surfaces 29 of the sheath 7 in the state that the manufacturing spacers 43 are interposed between the sheath 7 and the neutron absorber plates 22.

In this state, after the top end portions 26 of the load supporting rods 24 are secured to the sheath 7 by welding, the plurality of manufacturing spacers 43 are removed.

Play between the neutron absorber plates 22 and the inner surfaces 29 of the sheath 7 can be prevented by the sheath dimpling, the local projection of the neutron absorber plate (Hf plate) 22, employment of the washer, the top axis structure, etc. if the case may be.

As described above, according to the method of manufacturing the reactor control rod of the third embodiment, it is possible to manufacture the reactor control rod in which predetermined clearances are created between the inner surface 29 of the sheath 7 and the outer surfaces 30 of the neutron absorber plates 22. The reactor control rod being manufactured as above can achieve the same advantages as those in the above first and second embodiments.

Also, according to the method of manufacturing the reactor control rod of the third embodiment, since the slight clearance can be created between the steps 28 of the load supporting rods 24 and the inner surface 29 of the sheath 7, a stagnation time of the core water in this area can be shortened.

As has been explained in the above first and second embodiments, the mechanism utilizing the local spacers 32, etc. may be employed to hold the clearances between the inner surface 29 of the sheath 7 and the outer surfaces 30 of the neutron absorber plates (Hf plates) 22. If such clearances are held, the stagnation time of the core water can be shortened and in addition generation of a corrosion product can be suppressed.

Fourth Embodiment

Next, a reactor control rod according to a fourth embodiment of the present invention will be explained with reference to FIGS. 5A to 5B hereinbelow. In the reactor control rod according to the fourth embodiment, the local spacers in the above first embodiment are modified. In the fourth embodiment, description of configurations common to those in the first embodiment will be omitted, but configurations of different constituent portions will be explained in detail in the following.

Figure 5A:
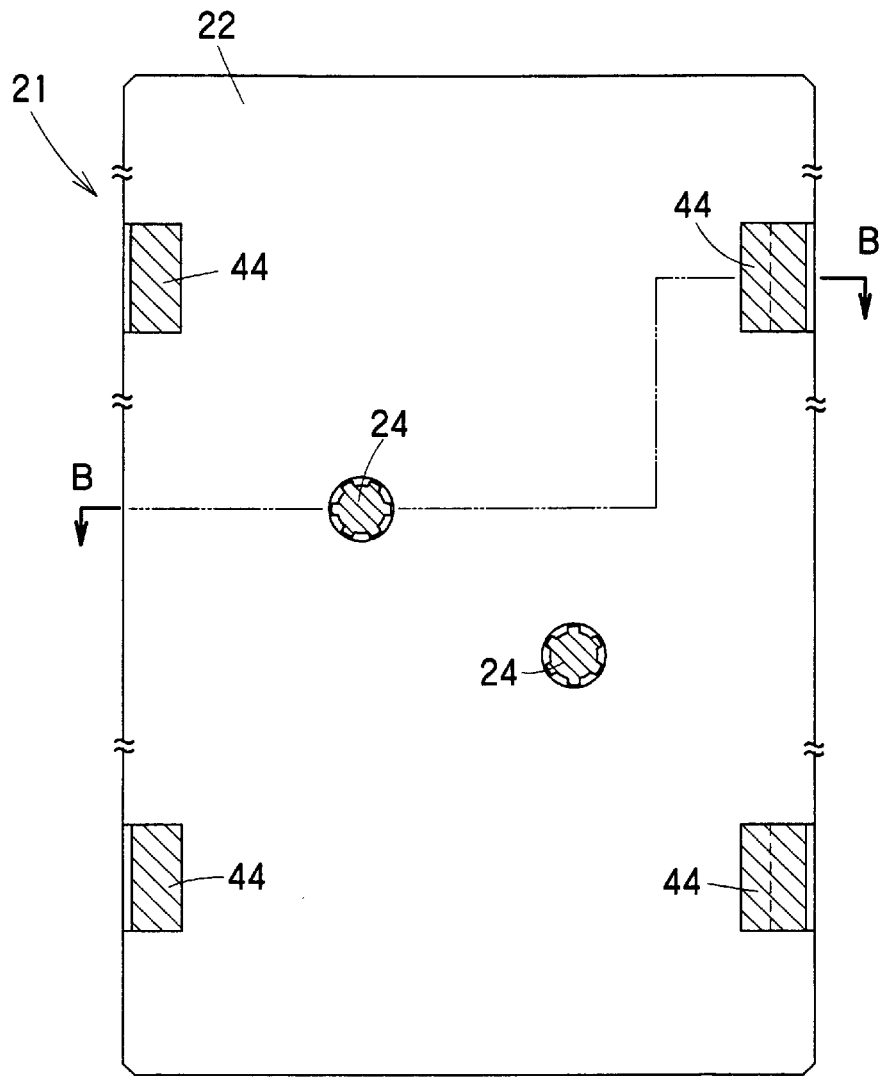
Figure 5B:
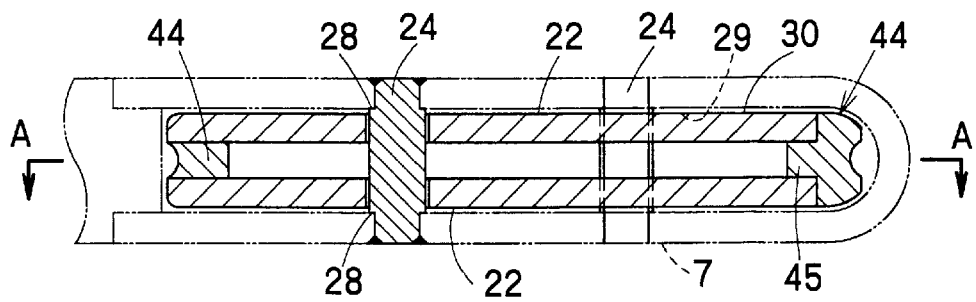

FIGS. 5A and 5B are views showing a pertinent portion of the wing 2 (see FIGS. 1A and 1B) of the reactor control rod according to the fourth embodiment of the present invention in an expanded manner. FIG. 5A is a sectional view showing the pertinent portion of the wing 2 of the reactor control rod taken along a line A—A in FIG. 5B. FIG. 5B is a cross sectional view showing the pertinent portion of the wing 2 of the reactor control rod taken along a line B—B in FIG. 5A.

At first, a difference between the fourth embodiment and the first embodiment is the configuration and the arrangement location of the local spacers.

More particularly, in the reactor control rod according to the fourth embodiment, a plurality of (e.g., four) local spacers 44 are positioned at end portions of the neutron absorber plates 22, acting as the neutron absorbing elements 21, along the sheath widthwise direction. Each of the local spacers 44 has a convex portion 45 which is interposed between a pair of neutron absorber plates 22 to hold a predetermined clearance therebetween.

There are many modifications of the fourth embodiment. For example, as shown in FIG. 6A, the neutron absorber plate (Hf plate) 22 without the local spacer 44 may be curved or bent at the location of the local spacer 44 and then secured to the opposing neutron absorber plate (Hf plate) 22 by welding. As shown in FIG. 6B, the neutron absorber plate (Hf plate) 22 without the local spacer 44 may curved or bent at the end portions in the sheath widthwise direction and then secured by welding over the total length of the plate 22.

The same advantages as those of the above first embodiment can be achieved by the reactor control rod according to the fourth embodiment. No strong friction can be generated between the inner surface 29 of the sheath 7 and the outer surfaces 30 of the neutron absorber plates 22, so that the passive state oxide film can be protected.

Fifth Embodiment

Next, a reactor control rod according to a fifth embodiment of the present invention will be explained with reference to FIG. 7 hereinbelow. In the reactor control rod according to the fifth embodiment, the configuration of the above first embodiment shown in FIG. 2 is partially modified. In the fifth embodiment, description of configurations common to those of the first embodiment will be omitted, but configurations of different constituent portions will be explained in detail in the following.

Figure 7:
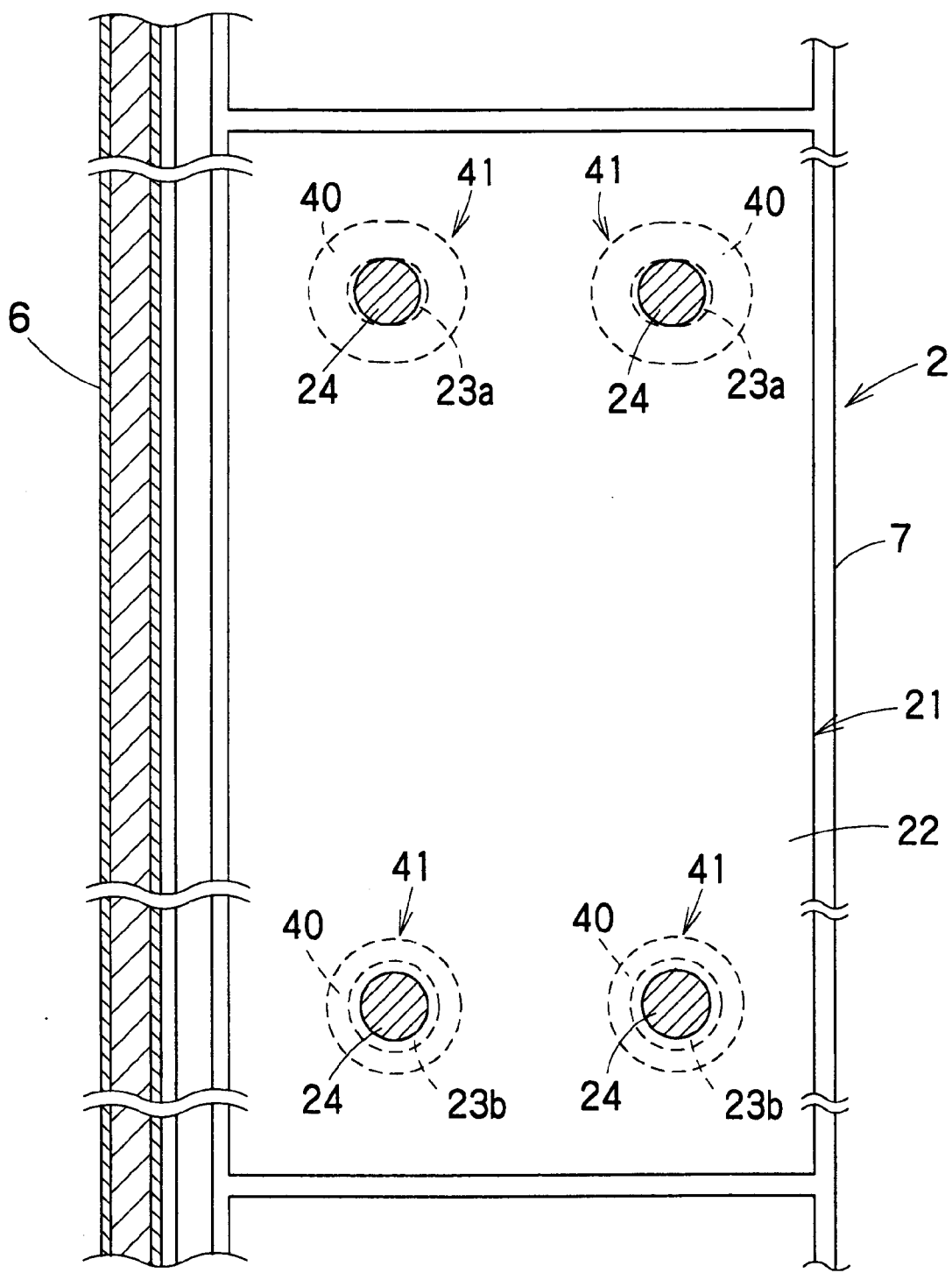
FIG. 7 is a front view showing a part of one wing of a reactor control rod according to a fifth embodiment of the present invention in the state that the sheath is removed therefrom.

FIG. 7 is a front view showing a part of a wing 2 of a reactor control rod according to the fifth embodiment in the state that the sheath 7 is removed therefrom. As shown in FIG. 7, in the reactor control rod according to the fifth embodiment, two spacer/load supporting rods 41 shown in FIG. 3 are provided in upper and lower areas of the neutron absorber plates 22, serving as the neutron absorbing elements 21, respectively.

More particularly, in the configuration of the first embodiment shown in FIG. 2A, two load supporting rods 24 positioned in the middle area shown in FIG. 2A can be omitted by replacing the local spacers 32 positioned in upper and lower areas with the spacer/load supporting rods 41 shown in FIG. 3.

In addition, in the reactor control rod according to the fifth embodiment, supporting rod through holes 23a formed in the upper area (the top end side along the sheath longitudinal direction) of the neutron absorber plates 22 and supporting rod through holes 23b formed in the lower area (the bottom end side along the sheath longitudinal direction) of the neutron absorber plates 22 are formed to have different shapes.

In other words, an inner diameter of the upper supporting rod through hole 23a is set such that a clearance between a hole wall surface of the supporting rod through hole 23a and a peripheral surface of the main portion 27 of the load supporting rod 24 along the sheath longitudinal direction is reduced small. More specifically, the upper supporting rod through hole 23a is formed as a slightly longitudinal hole in the sheath widthwise direction (the lateral direction of FIG. 7), and is formed such that a clearance is scarcely provided in the sheath longitudinal direction (control rod inserting/withdrawing direction).

The longitudinal hole in the sheath widthwise direction is provided to absorb the problem of difference in thermal expansion. The reason that the clearance is scarcely formed in the inserting/withdrawing direction is to prevent increase in the impact load which is applied to the load supporting rods 24 from the neutron absorber plates (Hf plates) 22 when the control rods are inserted and withdrawn.

In contrast, an inner diameter of the lower supporting rod through hole 23b is set large so as to allow movement of the neutron absorber plates (Hf plates) 22 in the sheath longitudinal direction due to thermal expansion. Since there exists difference in thermal expansion between the neutron absorber plates (Hf plates) 22 and the sheath 7, the neutron absorber plates (Hf plates) 22, whose position along the sheath longitudinal direction is fixed by the upper load supporting rod 24, expands and contracts downward. Therefore, a sufficient clearance is provided in the lower supporting rod through hole 23b along the sheath longitudinal direction so as to respond to such expansion/ contraction.

As one modification, two upper spacer/load supporting rods 41 or two lower spacer/load supporting rods 41 of four spacer/load supporting rods 41 may be replaced with the local spacers 32 shown in FIG. 2.

The upper spacer/load supporting rods 41 or the lower spacer/ load supporting rods 41 are not bound by the load supporting rods 24 if the structure is set as above. As a result, such structure can correspond to the case where the neutron absorber plates (Hf plates) 22 is moved relative to the sheath 7 because of difference in thermal expansion.

Sixth Embodiment

Next, a reactor control rod according to a sixth embodiment of the present invention will be explained with reference to FIGS. 8A to 8B hereinbelow. In the reactor control rod according to the sixth embodiment, the configuration of the above first embodiment shown in FIG. 2 is partially modified. In the sixth embodiment, description of configurations common to those of the second embodiment will be omitted, but configurations of different constituent portions will be explained in detail in the following.

Figure 8A:
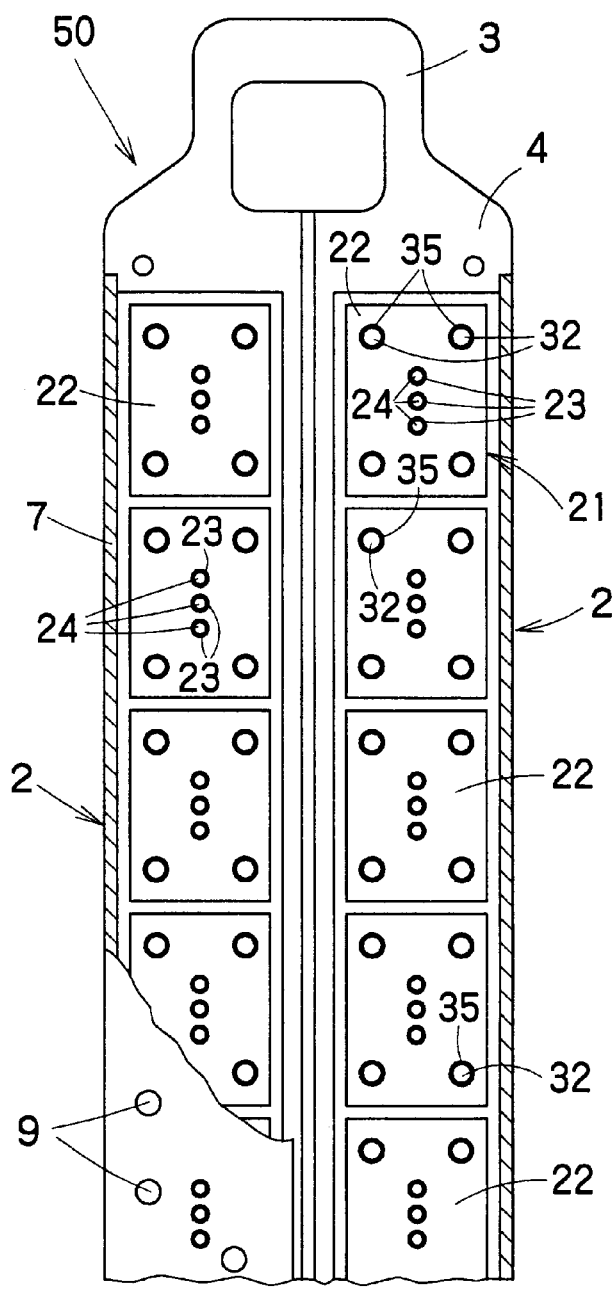
FIG. 8A is a front view showing a reactor control rod according to a sixth embodiment of the present invention in the situation that a sheath is partially cut away.

FIG. 8A is a front view showing a reactor control rod according to a sixth embodiment of the present invention in the situation that a sheath is partially cut away. FIG. 8B is a front view showing a neutron absorber plate of the reactor control rod according to the sixth embodiment of the present invention.

Figure 8B:
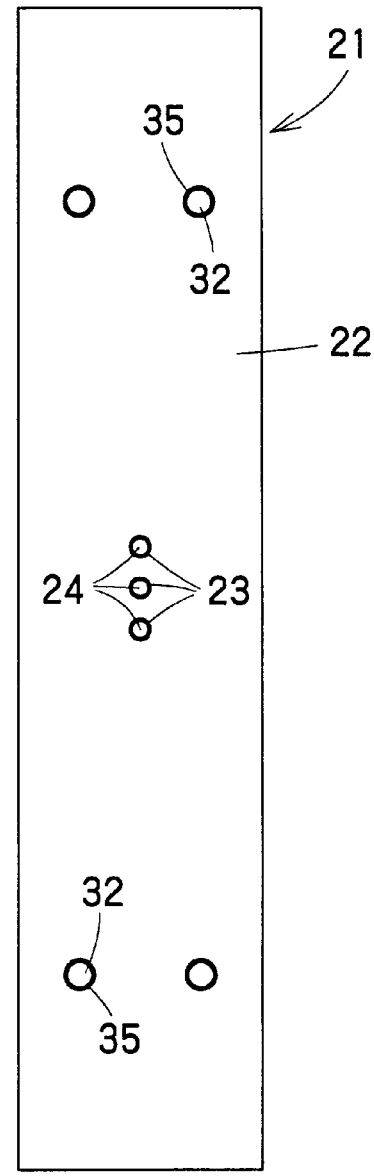
FIG. 8B is a front view showing a neutron absorber plate of the reactor control rod according to the sixth embodiment of the present invention.

As shown in FIGS. 8A and 8B, in the reactor control rod 50 according to the six embodiment, a plurality of (three) supporting rod through holes 23 are formed linearly along the sheath longitudinal direction in the almost center area of the neutron absorber plate 22, acting as the neutron absorbing element 21, in the sheath longitudinal direction and the sheath widthwise direction. The load supporting rods 24 shown in FIG. 2 are inserted into these supporting rod through holes 23.

In addition, in the reactor control rod according to the sixth embodiment, a pair of spacer through holes 35 are formed respectively in an upper area (top end side in the sheath longitudinal direction) and a lower area (bottom end side in the sheath longitudinal direction) of the neutron absorber plate 22. The local spacers 32 shown in FIG. 2 are fitted into the spacer through holes 35.

Respective diameters and shapes of the supporting rod through holes 23 and the main body portions 27 (see FIG. 2B) of the load supporting rods 24 are set such that a clearance between hole wall surfaces of the supporting rod through holes 23 and peripheral surfaces of the main body portions 27 of the load supporting rods 24 in the sheath longitudinal direction can be set minutely.

Accordingly, the weight of the neutron absorber plate 22 can be supported by the load supporting rods 24. In addition, if the neutron absorber plate 22 is moved relative to the sheath 7 relatively due to thermal expansion, relative movement is caused from the center portion in the vertical direction since the center portion of the neutron absorber plate 22 is fixed.

As a result, even if the neutron absorber plate 22 and the sheath 7 are rubbed together because of their relative movement, a rubbing distance can be shortened, so that damage of the passive state oxide film formed on the surface of the neutron absorber plates (Hf plates) 22 can be suppressed.

Besides, it is preferable that, like the upper supporting rod through hole 23a shown in FIG. 7, the supporting rod through holes 23 be formed as a longitudinal hole along the sheath widthwise direction. If the supporting rod through holes 23 are so formed, they can respond to the movement of the neutron absorber plate 22 in the sheath widthwise direction due to thermal expansion.

Seventh Embodiment

Next, a reactor control rod according to a seventh embodiment of the present invention will be explained with reference to FIG. 9 hereinbelow.

The reactor control rod according to the seventh embodiment is common in basic structure to the reactor control rod having the structure shown in FIGS. 1A and 1B. More particularly, this reactor control rod according to the seventh embodiment is constructed by securing the top end structure 4 and the bottom end structure 5 respectively to the longitudinal top end and the longitudinal bottom end of the long sheath 7 which has a deep U-shaped cross sectional shape, then aligning a plurality of plate-like neutron absorber elements 21 made of long-life neutron absorbing material in the sheath 7 along the sheath longitudinal direction like the column to thus form the wing 2, and then fitting and securing the opening portions of the wings 2 to the tie rod (central structure) 6 to assemble a plurality of wings 2 in combination. More specifically, the reactor control rod according to the seventh embodiment is formed by modifying partially the configuration of the reactor control rod shown in FIG. 4.

Figure 9:
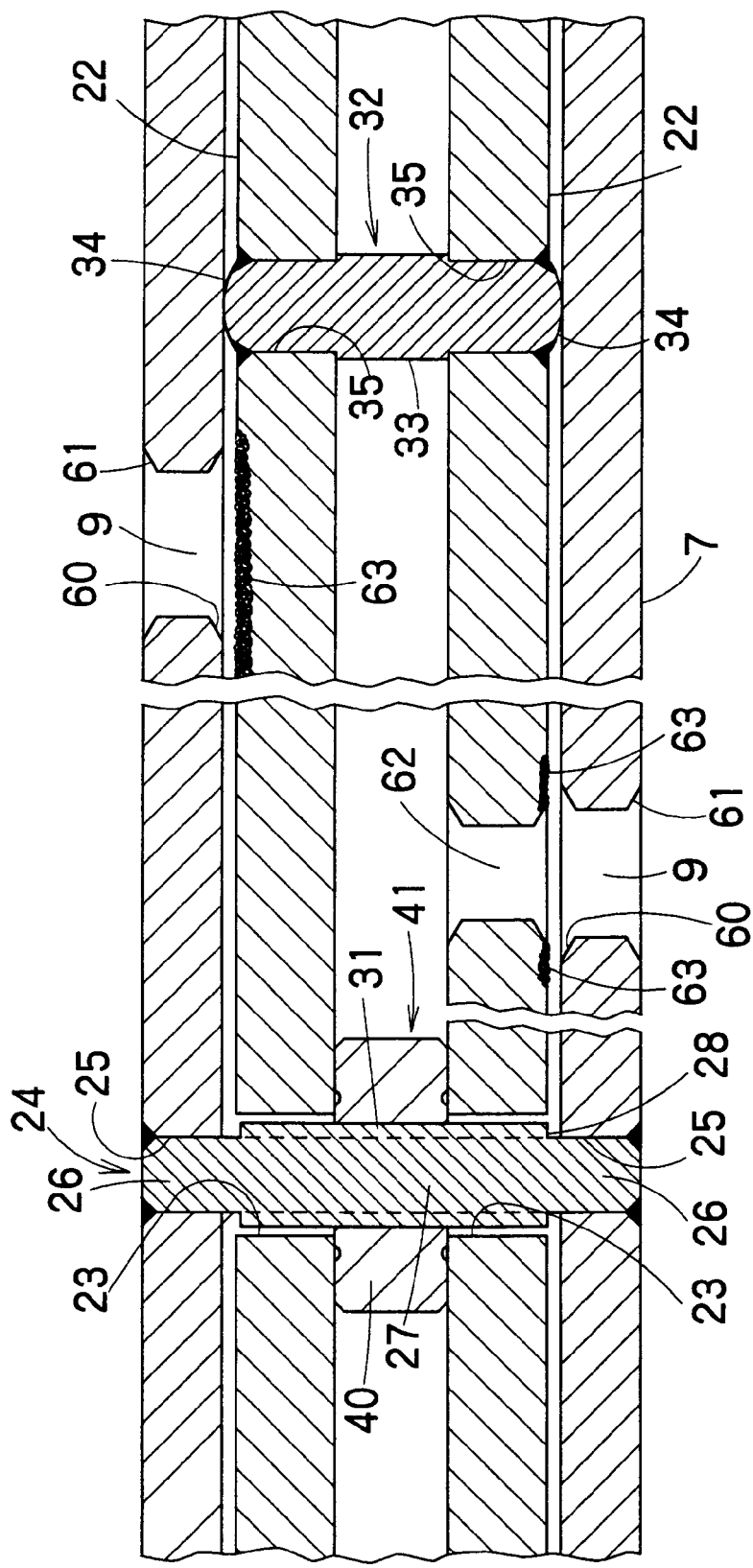
FIG. 9 is a sectional view showing a pertinent portion of a reactor control rod according to a seventh embodiment of the present invention.
Figure 10A:
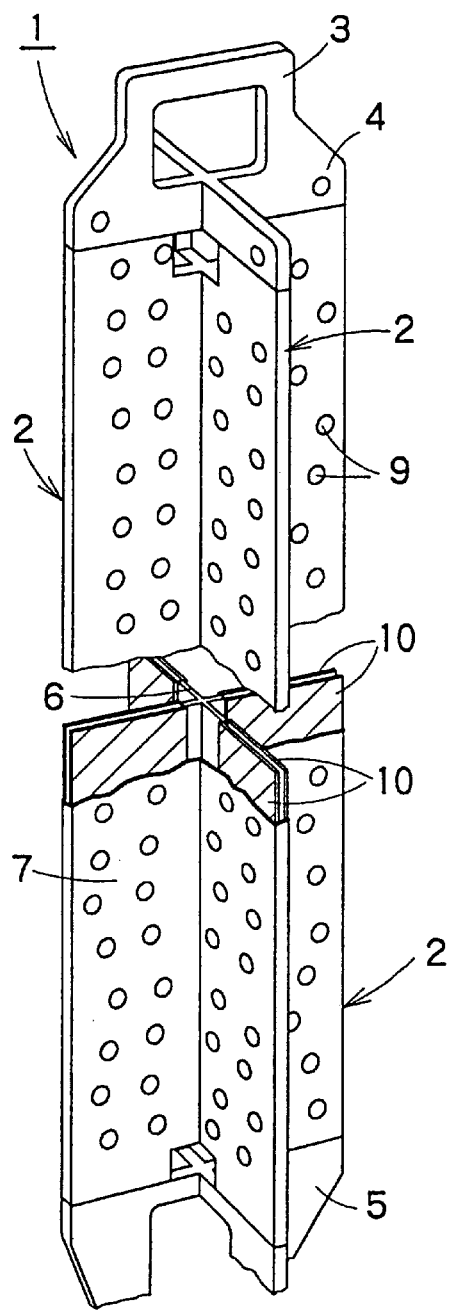
Figure 10B:
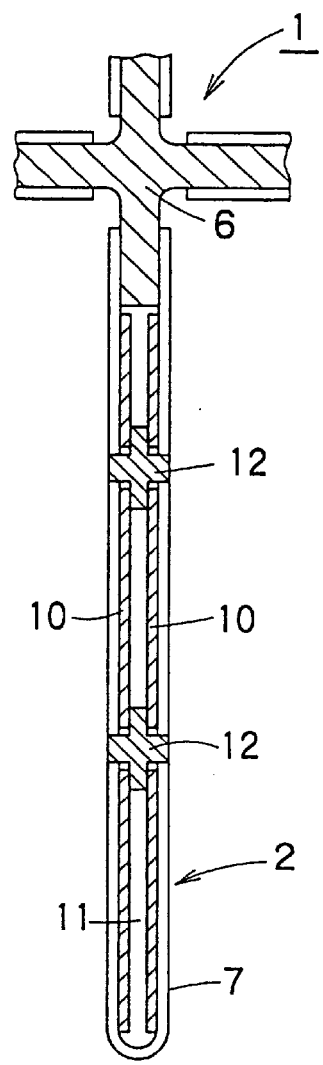
Figure 10C:
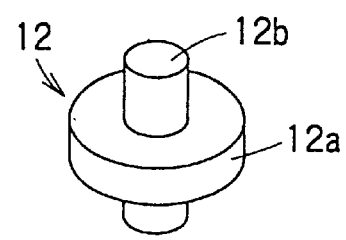
Figure 11A:
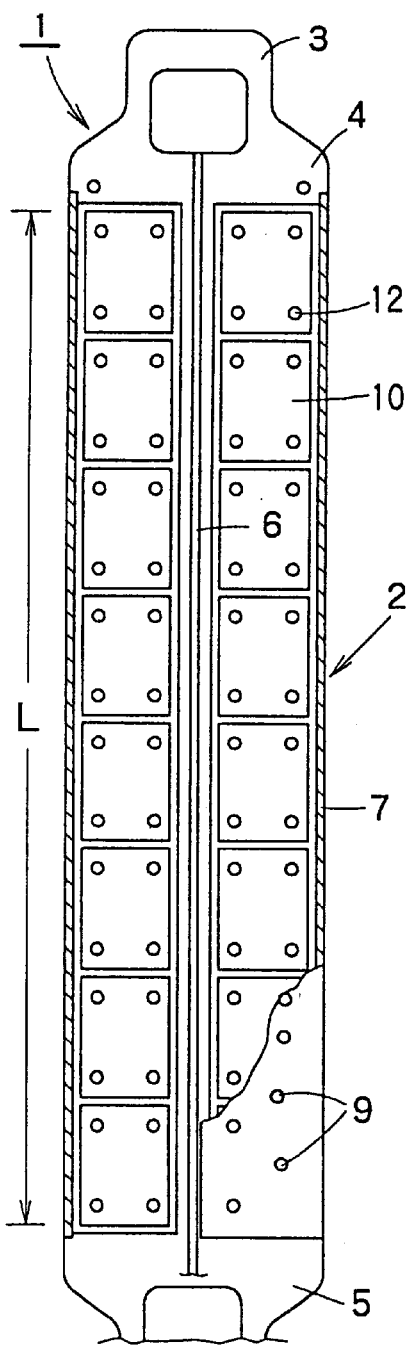
Figure 11B:
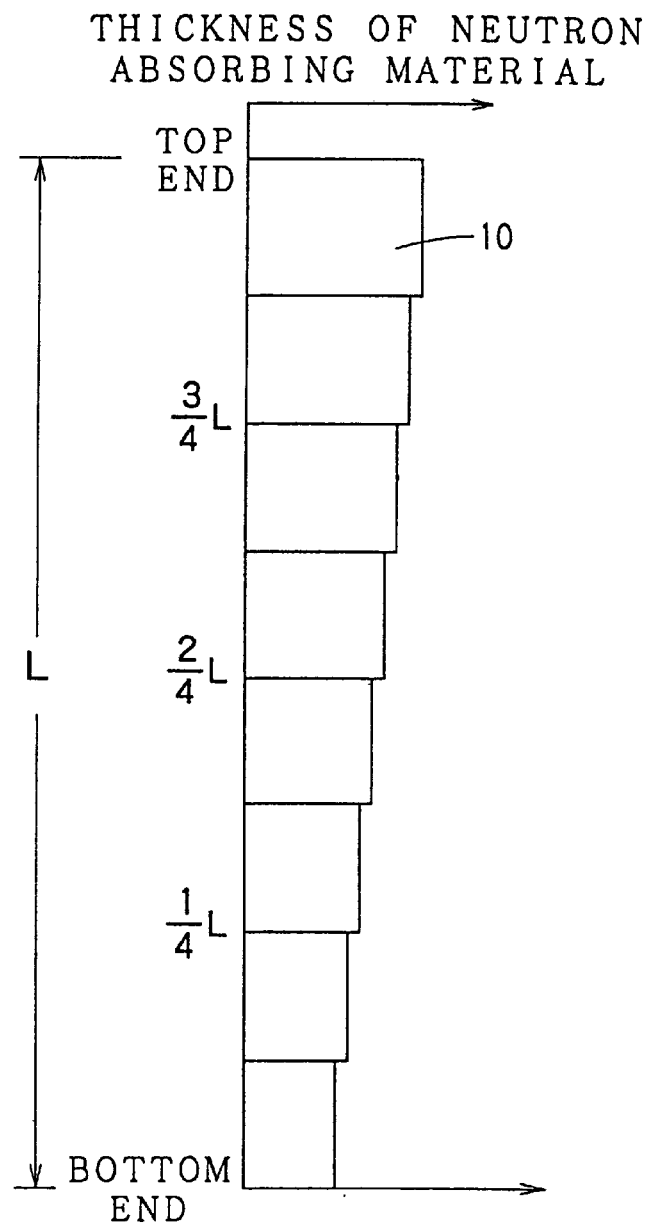

As shown in FIG. 9, in the reactor control rod according to the seventh embodiment, edge portions 60 and edge portions 61 of water feed holes 9 formed in the sheath 7, both are positioned on the neutron absorber plate 22 side (inner side) and the outer side respectively, are chamfered. Edge portions 60 of the water feed holes 9 are separated from the neutron absorber plate 22. Both edge portions of water feed holes 62 formed in the neutron absorber plate 22 are chamfered.

In the reactor control rod according to the seventh embodiment, the edge portions 60 of the water feed holes 9 formed in the sheath 7, which are positioned on the neutron absorber plate 22 side, are chamfered. Therefore, even if corrosion product 63 is generated on surfaces of the neutron absorber plate (Hf plate) 22, such a situation that corrosion product is scraped off by flashes formed on the edge portions 60 of the water feed holes 9 in the sheath 7 upon movement by the thermal expansion can be eliminated.

In order to supplement the description, normally the corrosion product is soft rather than original metal and its density is low, and therefore it can become inflated spatially. Unless the edge portions 60 of the water feed holes 9 are chamfered, such a phenomenon occurs that the corrosion product is scraped off in a thermal expansion cycle caused at start/stop, etc. of the reactor.

The corrosion product being scraped off is discharged into the core water to stray therein. In the case of hafnium (Hf), the problem of radioactivity storage does not occur since a half life is relatively short like about 43 days, but a possibility that a radioactivity level of the core water, which has been reduced remarkably up to this day, is made worse even slightly can be supposed since Hf-181 (which emits gamma rays such as 482 keV, 346 keV, etc.) is contained. For this reason, the above problem can be overcome by the configuration of the reactor control rod according to the seventh embodiment.

The seventh embodiment may be combined arbitrarily with any of the above first to sixth embodiment or eighth and ninth embodiments to be described later.

Eighth Embodiment

Next, a reactor control rod according to an eighth embodiment of the present invention will be explained hereinbelow. The eighth embodiment may be combined arbitrarily with any of the above first to seventh embodiment or a ninth embodiment to be described later.

The reactor control rod according to the eighth embodiment is common in basic structure to the reactor control rod having the structure shown in FIGS. 1A and 1B. More particularly, this reactor control rod according to the eighth embodiment is constructed by securing the top end structure 4 and the bottom end structure 5 respectively to the longitudinal top end and the longitudinal bottom end of the long sheath 7 which has a deep U-shaped cross sectional shape, then aligning a plurality of plate-like neutron absorber elements 21 made of a long-life neutron absorbing material in the sheath 7 along the sheath longitudinal direction like the column to thus form the wing 2, and then fitting and securing the opening portions of the wings 2 to the tie rod (central structure) 6 to assemble a plurality of wings 2 in combination.

However, the shape of the neutron absorbing element is not limited to a plate shape. In addition to the so-called trap type control rod employing the Hf plate shown in FIG. 1, the eighth embodiment may be applied to the control rod of a type in which a plurality of rod-like neutron absorbing material (e.g., Hf rods) are immersed directly in the core water.

In the reactor control rod according to the eighth embodiment, the neutron absorber element is constructed by forming the neutron absorbing material containing at least hafnium into a plate, a rod, etc. Further, a hafnium density on the surface area of the neutron absorber element is set lower than an internal hafnium density.

More particularly, the neutron absorber element of the reactor control rod according to the eighth embodiment is constructed by covering the surface of the Hf member formed a plate, a rod, etc. with an alloy containing the low Hf density (e.g., zircaloy-2, zircaloy-4, Hf—Zr alloy containing the low Hf density, etc.).

Hafnium (Hf) and zirconium (Zr) are materials which can be employed to form an alloy at any rates, i.e., to form a full composition solid-solution type alloy. Such alloy having a different composition ratio is formed weldably.

The passive state film having the low Hf composition ratio is formed on the surface of the neutron absorber element. Assume the case where this film is released once because of generation of a strong friction force, the reactivity value is not affected at all since the Hf density is low and also the Hf-Zr alloy, if employed, can less contribute to the increase of the radioactivity density of the core water since Zr is different to radioactivate rather than Hf. That is, the reactivity and radioactivity problems are scarcely caused.

Since in principle the corrosion advances from the surface of the neutron absorber element, the corrosion of Zr first occurs in the reactor control rod according to the eighth embodiment and therefore start of the corrosion of Hf can be considerably deferred. Since Zr has the induced radioactivity density extremely lower than Hf and also Zr is used widely as the fuel rod covering tube, etc., the problem of increase of the radioactivity level due to the reactor control rod can be completely eliminated.

As in the case where the zircaloy having excellent corrosion resistance has been invented by adding iron, chromium, nickel, tin, etc. into zirconium, the possibility that the corrosion resistance of Hf can be improved by adding these elements into the Hf member itself may be thought of, nevertheless no necessity of such improvement has arisen in the related art. It has already become evident that such improvement is effective for the Hf—Zr alloy. However, in case it is possible to aim at the longer lifetime of the control rod employing Hf, the advantage can be achieved by improving the corrosion resistance of the Hf itself much more and also coating the control rod with the zircaloy, etc.

As described above, according to the reactor control rod of the eighth embodiment, the neutron absorber element is formed of the neutron absorbing material containing at least hafnium, and also the hafnium density on the surface portion of the neutron absorber element is set lower than its inner density. As a result, discharge of the hafnium into the core water because of corrosion of the neutron absorber element can be suppressed, so that the radioactivity level in the periodical inspection, for example, can be suppressed low.

Ninth Embodiment

Next, a reactor control rod according to an ninth embodiment of the present invention will be explained hereinbelow. The ninth embodiment may be combined arbitrarily with any of the above first to eighth embodiments.

The reactor control rod according to the ninth embodiment is common in basic structure to the reactor control rod having the structure shown in FIGS. 1A and 1B. More particularly, this reactor control rod according to the ninth embodiment is constructed by securing the top end structure 4 and the bottom end structure 5 respectively to the longitudinal top end and the longitudinal bottom end of the long sheath 7 which has a deep U-shaped cross sectional shape, then aligning a plurality of plate-like neutron absorber elements 21 made of long-life neutron absorbing material in the sheath 7 along the sheath longitudinal direction like the column to thus form the wing 2, and then fitting and securing the opening portions of the wings 2 to the tie rod (central structure) 6 to assemble a plurality of wings 2 in combination.

However, the shape of the neutron absorbing element is not limited to a plate shape. In addition to the so-called trap type control rod employing the Hf plate shown in FIG. 1, the eighth embodiment may be applied to the control rod of a type in which a plurality of rod-like neutron absorbing material (e.g., Hf rods) are immersed directly in the core water.

The reactor control rod according to the ninth embodiment is characterized in that an effective surface area can be reduced by processing the surface of the neutron absorber element to improve smoothness. That is, the effective surface area of the surface of the Hf member such as the plate, the rod, etc. to thus suppress an amount of surface corrosion.

In order to supplement the description, since there is a minute unevenness on the actual surface of the neutron absorber element and such uneven surfaces contact with the core water, the actual surface area (reaction area) is increased remarkably rather than the apparent surface area. In addition, unevenness on the surface of the neutron absorber element causes the stagnation of the core water and also causes the corrosion.

Therefore, if the unevenness on the surface like the reactor control rod according to the ninth embodiment is suppressed, an amount of the corrosion product can be suppressed considerably. There are many known methods as the method of suppressing the unevenness on the surface. For example, there are mechanical polishing, chemical polishing (chemical processing), electrochemical polishing (electro- chemical processing), composite polishing employing above polishing in combination, or the like.

In the above first to ninth embodiments of the present invention, the description of the example of "the trap type configuration in which two sheets of Hf plates are opposed to sandwich the water gap inside the sheath made of stainless steel" has been made mainly. But most of the embodiments of the present invention may be applied to the control rod of a type in which Hf is exposed directly to the core water.

In the above embodiments of the present invention, the description of the control rod employing the integral type center assembling material (tie rod) has been made. But the present invention may be applied to the "control rod of the type in which Hf is exposed to the core water", i.e., in which independent structural materials which have been developed in Europe and in which center axes of the control rods are not perfectly integrated with each other is employed.

As described above, according to the reactor control rod of the present invention, since the minute clearance can be formed without fail between the sheath and the neutron absorber elements, contact areas between metals of a different kind can be remarkably reduced and also the possibility of the electrochemical corrosion can be reduced. Also, damage of the passive state oxide film formed on the surface of the neutron absorber element can be prevented.

Since the corrosion problem can be relaxed extremely in this manner, the long-term reactor control rod in which the nuclear lifetime and the electrochemical lifetime can be well balanced can be obtained and economical efficiency and safety of the nuclear power generation can be improved. Also, an amount of radioactive waste can be reduced.

According to the reactor control rod of the present invention, the neutron absorber element is formed of the neutron absorbing material containing at least hafnium, and also the hafnium density on the surface portion of the neutron absorber element is set lower than its inner density. As a result, discharge of the hafnium into the core water because of corrosion of the neutron absorber element can be suppressed.

According to the reactor control rod of the present invention, since the effective surface area can be reduced by processing the surface of the neutron absorber element to improve smoothness, an amount of surface corrosion of the neutron absorber element can be suppressed.

According to the reactor control rod of the present invention, since the edge portions of the water feed holes formed in the sheath, which are positioned on the neutron absorber plate side, are chamfered, discharge of the corrosion product generated on the surface of the neutron absorber element into the core water can be suppressed.

Moreover, according to the method of manufacturing the reactor control rod of the present invention, it is possible to manufacture the reactor control rod in which the minute clearance can be formed without fail between the sheath and the neutron absorber elements. The reactor control rod being manufactured in this manner can suppress generation of the corrosion product. Since the corrosion problem can be relaxed extremely in this manner, the long-term reactor control rod in which the nuclear lifetime and the electrochemical lifetime can be well balanced can be obtained. As a result, economical efficiency and safety of the nuclear power generation can be improved and also an amount of radioactive waste can be reduced.

What is claimed is:

1. A reactor control rod, comprising:
   a wing having a sheath which has a substantially U-shaped cross-section and an opening;
   a water feed hole formed in said sheath for introducing core water into said wing;
   a top end structure secured to a longitudinal top end of said sheath;
   a bottom end structure secured to a longitudinal bottom end of said sheath;
   a central structure to which said opening portion of said sheath is secured;
   a neutron absorber element made of a neutron absorbing material, said neutron absorber element being charged in said sheath;

a supporting rod through hole formed in said neutron absorber element, so as to penetrate said neutron absorber element;

a supporting rod fitting hole formed in said sheath; and a load supporting rod inserted into said supporting rod through hole, said load supporting rod having:

a top end portion inserted into said supporting rod fitting hole, so as to support a weight of said neutron absorber element by said sheath via said load supporting rod, a main body portion having a diameter larger than that of said top end portion, and a step formed by a difference in diameters between said top end portion and said main body portion, so as to create a minute clearance between said sheath and said neutron absorber element, wherein a groove is formed on a surface of said main body portion of said load supporting rod substantially parallel to a longitudinal direction of said load supporting rod, so that a core water is passed between said load supporting rod and said neutron absorber element.

2. A reactor control rod according to claim 1, further comprising a plurality of local spacers, wherein said neutron absorber element comprises a pair of neutron absorber plates, said neutron absorber plates being opposed to and spaced from each other by said local spacers, so as to hold a predetermined clearance between said opposing neutron absorber plates, said local spacer comprises a body portion provided between said opposing neutron absorber plates, so as to hold said predetermined clearance therebetween, and axis portions protruded from both ends of said body portion, so as to be inserted into spacer through holes formed in said neutron absorber plates, wherein top ends of said axis portions are slightly protruded outwardly beyond outer surfaces of said neutron absorber plates, so as to create minute clearances between said sheath and said neutron absorber plates.

3. A reactor control rod, comprising:

a wing having a sheath which has a substantially U-shaped cross-section and an opening;

a water feed hole formed in said sheath for introducing core water into said wing;

a top end structure secured to a longitudinal top end of said sheath;

a bottom end structure secured to a longitudinal bottom end of said sheath;

a central structure to which said opening portion of said sheath is secured;

a neutron absorber element made of a neutron absorbing material, said neutron absorber element being charged in said sheath;

a supporting rod through hole formed in said neutron absorber element, so as to penetrate said neutron absorber element;

a supporting rod fitting hole formed in said sheath;

a load supporting rod inserted into said supporting rod through hole, said load supporting rod having:

a top end portion inserted into said supporting rod fitting hole, so as to support a weight of said neutron absorber element by said sheath via said load supporting rod, a main body portion having a diameter larger than that of said top end portion, and a step formed by a difference in diameters between said top end portion and said main body portion, so as to create a minute clearance between said sheath and said neutron absorber element; and a plurality of local spacers, wherein said neutron absorber element comprises a pair of neutron absorber plates, said neutron absorber plates being opposed to and spaced from each other by said local spacers, so as to hold a predetermined clearance between said opposing neutron absorber plates, said local spacer comprises a body portion provided between said opposing neutron absorber plates, so as to hold said predetermined clearance therebetween, and axis portions protruded from both ends of said body portion, so as to be inserted into spacer through holes formed in said neutron absorber plates, wherein top ends of said axis portions are slightly protruded outwardly beyond outer surfaces of said neutron absorber plates, so as to create minute clearances between said sheath and said neutron absorber plates.

* * * * *